(12) United States Patent
Haimer et al.

(10) Patent No.: US 9,506,694 B2
(45) Date of Patent: Nov. 29, 2016

(54) TURBO DRYING BY AIR KNIFE

(75) Inventors: Franz Haimer, Hollenbach (DE);
Wolfgang Kuegle,
Aichach-Griesbeckerzell (DE)

(73) Assignee: Haimer GmbH, Hollenbach (DE)

( * ) Notice: Subject to any disclaimer, the term of this patent is extended or adjusted under 35 U.S.C. 154(b) by 868 days.

(21) Appl. No.: 13/817,588

(22) PCT Filed: Aug. 5, 2011

(86) PCT No.: PCT/EP2011/063509
§ 371 (c)(1),
(2), (4) Date: May 6, 2013

(87) PCT Pub. No.: WO2012/022630
PCT Pub. Date: Feb. 23, 2012

(65) Prior Publication Data
US 2013/0212899 A1    Aug. 22, 2013

(30) Foreign Application Priority Data

Aug. 19, 2010  (DE) .................. 10 2010 034 869

(51) Int. Cl.
| F26B 21/00 | (2006.01) |
| B23P 11/02 | (2006.01) |
| F26B 25/06 | (2006.01) |
| F26B 9/06 | (2006.01) |
| F26B 21/04 | (2006.01) |

(52) U.S. Cl.
CPC ............ *F26B 21/003* (2013.01); *B23P 11/027* (2013.01); *F26B 21/004* (2013.01); *F26B 25/06* (2013.01); *F26B 9/06* (2013.01); *F26B 21/04* (2013.01)

(58) Field of Classification Search
CPC .... F26B 21/003; F26B 21/004; F26B 21/04; F26B 25/06; F26B 9/06; B23P 11/027
See application file for complete search history.

(56) References Cited

U.S. PATENT DOCUMENTS

| 1,605,839 | A |   | 11/1926 | Herman |
| 1,765,380 | A | * | 6/1930 | McGinnis .............. A45D 20/26 |
|           |   |   |        | 34/99 |
| 6,739,072 | B2| * | 5/2004 | Knoer ................... C02F 11/123 |
|           |   |   |        | 34/203 |
| 2002/0148137 | A1 |  | 10/2002 | Eisenacher et al. |
| 2010/0058608 | A1 |  | 3/2010 | Moon et al. |

FOREIGN PATENT DOCUMENTS

| DE | 1025791 B | 8/1958 |
| DE | 1947484 U | 9/1964 |
| DE | 29621411 U | 5/1998 |

(Continued)

OTHER PUBLICATIONS

"International Search Report for PCT Application No. PCT/EP2011/063509", Mailed Date: Aug. 29, 2011, Filed Date: Jun. 9, 2011, 3 Pages.

*Primary Examiner* — Jiping Lu

(57) ABSTRACT

A device for drying a work piece, preferably in the form of a shrink fit chuck, that previously been subjected to an application of a liquid and is essentially rotationally symmetrical around a longitudinal axis of the work piece; the device has at least one air-conducting device that encompasses the work piece in order to convey an air flow in the direction along the longitudinal axis of the work piece and has at least one blower device that directs a radial air flow at the work piece.

15 Claims, 7 Drawing Sheets

(56) References Cited

FOREIGN PATENT DOCUMENTS

| DE | 19941184 A1 | 3/2001 |
| DE | 102005024766 A1 | 11/2006 |
| DE | 202006002270 U | 5/2007 |
| DE | 102007002317 A1 | 2/2008 |
| DE | 102008051282 A1 | 4/2010 |
| GB | 1044166 | 9/1966 |
| JP | S6155581 A | 3/1986 |
| JP | H02192584 A | 7/1990 |
| JP | H07155706 A | 6/1995 |
| JP | 2004361017 A | 12/2004 |
| JP | 2008188687 A | 8/2008 |

\* cited by examiner

TURBO DRYING BY AIR KNIFE

FIELD OF THE INVENTION

The invention relates to a technology for drying a work piece, which has previously been subjected to a heat application and then cooled again through the use of a liquid, in particular a multi-part shrink-fit connection, preferably in the form of a tool holder for the centered shrink-fitting (a so-called shrink fit chuck) of the shaft of a rotating tool such as a drill bit, milling cutter, or reaming tool.

BACKGROUND OF THE INVENTION

There is an extensive body of prior art that addresses solving the problem of how, with the aid of a liquid, to cool down a tool holder again that has been subjected to a heat application and then to effectively dry it.

Roughly summarized, three different cooling principles have been proposed up to this point. Namely air cooling, liquid cooling, and cooling through contact with a solid, i.e. by bringing the surface of the tool holder to be cooled into intimate contact with a very thermally conductive cooling element into which the heat flows.

The technologies that have been known up to this point and their disadvantages are described in detail in the older, but not published German patent application of the applicant, identified under the serial number DE 10 2009 034 730.

In order to solve the problems of the known prior art, in the above-mentioned older, but not published German patent application, the applicant proposes a device that makes use of a carrier gas flow guided in the circuit, into which a cooling liquid is misted in fine droplet form. It is thus possible to cool the work piece effectively and very uniformly, without excessively wetting it.

However, internal testing by the applicant has shown that even this device, which already works particularly well, can be further improved upon because this device may in fact be able to quite effectively dry the work pieces, which are in any case wetted only slightly, because the misting of the cooling liquid is stopped and the pure carrier gas flow, which is no longer charged with the cooling liquid droplets, continues to circulate turbulently around the work piece for a while longer, thus drying it.

When drying with the aid of the device known from these older applications, the main flow direction of the rapid, turbulent carrier gas flow is oriented essentially in the direction of the longitudinal axis of the work piece. This naturally results in the fact that in the region of recesses such as circumferential grooves or counterbores for set screws and the like, "lee zones"—figuratively speaking—form (in a quickly flowing body of water, they would be referred to as "dead water zones") in which cooling liquid residues can collect beyond the end of the drying cycle, without being entrained with and removed by the carrier gas flow circulating turbulently around the work piece.

As internal testing has shown, this problem also could not be completely solved by turbulence-generating devices installed in the carrier gas flow just upstream of the region of the work piece to be dried, the task of which devices was to create even more intense turbulence in the carrier gas flow still flowing chiefly in the direction of the longitudinal axis of the work piece and/or to provide it with a swirling motion.

In view of this, the object of the present invention is to disclose a device for air-drying a work piece that has previously been subjected to a liquid application (washing and/or cooling), which is able to dry the work piece more quickly and reliably. This object should be attained primarily, but not exclusively, for work pieces that are essentially rotationally symmetrical around a longitudinal axis of the work piece and have a difficult-to-dry region that tapers toward one end. In a tool chuck for which this object should in particular be attained, this is the region that extends from the maximum diameter of the tool chuck to the sleeve part that holds the shaft of the tool.

SUMMARY OF THE INVENTION

In order to attain this object, the invention provides a device for drying a work piece that has previously been subjected to a liquid application and/or a heat application and has then been cooled again through the use of a liquid, which work piece is essentially rotationally symmetrical around a longitudinal axis of the work piece and is preferably embodied in the form of a tool chuck or a shrink fit chuck, which is characterized in that the device has at least one air-conducting device surrounding the work piece for conveying an air flow in the direction along the longitudinal axis of the work piece or tool chuck or shrink fit chuck and at least one blower device that directs a radial air flow at the work piece.

As will be explained in detail below, the term "air" is preferably interpreted broadly here.

The air-conducting device is preferably a separate component from the tubular wall that constitutes the conduit, inside which the air flow circulates and which encompasses the work piece to be dried.

The air-conducting device is embodied so that it permits a (distinct) air flow to be produced and maintained, which essentially flows in the direction along the longitudinal axis of the work piece (deviations of up to 25 degrees, or better still only up to 15 degrees from the longitudinal axis, e.g. work pieces that are in a certain sense conical, are easily noncritical; larger deviations are noncritical only if the function according to the invention is achieved, for example because the deviation is locally limited).

The decisive factor is that a distinct flow in the longitudinal direction, which uniformly envelops the work piece, overlaps with at least one flow that intersects with this flow in the longitudinal direction and first strikes the work piece in an essentially radial direction.

The device therefore additionally has at least one blower device that blows against the work piece with a radial air flow. A radial air flow is an air flow that additionally has at least a distinct speed and motion component in the radial direction, i.e. in the direction of a normal to the longitudinal axis of the work piece. Such a radial air flow ideally first strikes the surface of the work piece in a direction that is (essentially, i.e. ±10 degrees) parallel to this normal. If, in less optimal embodiments of the invention, the radial air flow strikes the surface of the work piece obliquely, then it first strikes this surface at an angle α of at least ≤60 degrees, preferably ≤45 degrees, and ideally ≤30 degrees.

Such a radial air flow is also able to set into motion those cooling liquid residues that have remained in "lee zones" that are not swept intensely enough by the flow occurring in the direction of the longitudinal axis of the work piece. As soon as the radial air flow strikes these liquid residues and has set them into motion out of their shaded position ("lee position" or "dead water position"), they are entrained by the air flow, which flows essentially in the direction along the longitudinal axis of the work piece, and are conveyed away in the flow direction past the entire rest of the work piece surface—an air flow that in cooperation with the at least one radial air flow produces such a transporting-away function is understood to be a distinct air flow essentially in the direction along the longitudinal axis of the work piece.

This differentiates the device according to the invention from those devices in which at least one radial air flow is in fact directed at the work piece, but this is primarily used only for vaporizing the liquid residues and/or to swirl them so that they predominantly fall under the influence of gravity—as is the case for example in devices in which the work piece to be dried is accommodated in a bell, which is closed on three sides and open toward the bottom, and is then shot with at least one radially oriented compressed air jet whose flow is tightly bundled and at first flows rapidly, but is nevertheless small enough that after first striking the surface of the work piece, it is only able to produce a comparatively slow flow of air flowing away in the longitudinal direction, which is not able to actively entrain larger liquid droplets (e.g. with an average diameter of greater than 0.5 mm).

Insofar as the present application speaks of movement directions or components or of speed components, it must be clear that this does not constitute a micro-consideration of individual particles in the turbulent flow, but rather a consideration of the entire resulting movement and speed—as the person skilled in the art would illustrate, for example, by respectively placing strands, which are free at one end, or smoke particles into the flow.

The above-mentioned distinct air flow in the direction along the longitudinal axis of the work piece is preferably produced by the fact that an air flow already flowing in the above-mentioned direction flows into the air-conducting device and then—preferably downstream—overlaps with the at least one radial air flow. Alternatively, however, it is also possible—even though this embodiment is not preferable—to only use at least one radial air flow, which is so powerful that after the first radially directed impact with the surface of the work piece, a distinct air flow essentially in the direction along the longitudinal axis of the work piece can be produced.

According to a preferred embodiment, the air-conducting device surrounding the work piece is embodied so that it conveys the air flow along a region close to the surface of the work piece.

This preferred air-conducting device is embodied so that—with the correct positioning of the work piece—it conducts or guides the preponderance of the air flow occurring around the work piece along the locations of the work piece surface that are critical with regard to the drying.

Preferably, the air-conducting device surrounds the work piece at least in some regions.

The air-conducting device according to the invention is not just a part of a smooth, cylindrical tube with a constant diameter that accommodates the work piece to be dried and conveys the drying air to and from it, but rather is a component that is distinct from this tube and is embodied so that it deflects and/or conducts the air in a particular way.

Contrary to a mere exertion of a blowing action on the work piece accommodated in the above-mentioned round tube, the air-conducting device ensures that at least the critical locations of the circumferential surface of the work piece to be dried can be swept by the turbulent air flow very intensively and with a uniformly high speed—because it is specifically not the case that the preponderance of the air flow passes by at a greater distance from the critical locations of the work piece to be dried, therefore ineffectually "blowing off" a goodly amount of the air flow; instead, the entire air flow is guided past and in close proximity to a location of the work piece that is critical for the drying.

Advantageously, the air-conducting device, viewed in the main flow direction of the overall flow, has different inner diameters. Preferably, the air-conducting device is embodied so that in at least one critical location or locations of the work piece to be dried, it forms a gap with a gap size of ≤5 cm, or better still ≤3 cm, and ideally ≤1 cm around the circumference of the work piece to be dried, through which gap the drying air flows. In this connection, it is preferably only necessary to maintain this gap size in a basic sense, i.e. there is no harm if a larger gap size is produced in limited locations. Typically, the flow that the air-conducting device, when embodied as intended, must guide along the surface of the work piece to be dried is essentially a flow that flows out by the shortest path or flows out with a certain amount of swirl, essentially in the direction of the longitudinal axis of the work piece.

According to a first preferred embodiment, the air-conducting device is embodied in the form of an air-conducting bell that overlaps the work piece to be dried (preferably continuously overlapping and essentially enclosing three sides of the work piece to be dried) i.e. is embodied in the form of an air-conducting bell whose interior accommodates the entire work piece at least during the drying cycle and preferably, also already accommodates it during the optional cool-down cycle.

In this case, the interior formed by an air-conducting bell that is preferably used has a diameter that is not constant. Instead, the inner diameter of the air-conducting bell varies along its longitudinal axis—preferably so that the air-conducting bell permits different-sized work pieces, which are to be dried by the device when it is used as intended, to be inserted into its interior so that the air-conducting bell forms a gap around the circumference of the work piece to be dried, through which the drying air flows, which gap is continuous in the longitudinal direction and has the above-mentioned maximum gap sizes; all of the statements made above apply here as well. Particularly when designing the air-conducting bell for drying tool chucks, the following procedure is preferably used in order to give the air-conducting bell its shape: a group of tool chucks with different diameters and lengths is assembled, which are to be dried by the device when it is used as intended. The air-conducting bell is then shaped so that all of the chucks, which are to be dried when the bell is used as intended, can be accommodated in the air-conducting bell in such a way that the air-conducting bell forms a gap, which is continuous in the longitudinal direction and has the above-mentioned maximum gap sizes, around the circumference of the tool chucked to be dried, through which gap the drying air flows.

The air-conducting device can be used in such a way that in order to reach their optimum position, smaller tool chucks must be slid farther into the air-conducting bell than tool chucks with a larger diameter.

Alternatively, the air-conducting bell can be used so that all of the tool chucks to be accommodated by it are supported on one and the same base surface and the air-conducting bell, which is movable in the direction of the work piece axis, is slid over the tool chuck until it comes to a stop—preferably at the level of the above-mentioned base surface.

The work piece to be dried and in particular, a tool chuck, is preferably accommodated in the device in an orientation in which the work piece longitudinal axis is oriented at least essentially parallel to or congruent with the longitudinal axis of the air-conducting bell. Certain angular deviations (of up to 15 degrees) between the work piece longitudinal axis and the longitudinal axis of the air-conducting bell are fairly noncritical, but such deviations are in any case of a more theoretical consideration.

The diameter of the receiving compartment formed by the interior of the air-conducting bell increases in the downstream direction, preferably in a continuous fashion. This enlargement occurs, at least in some places, so that when embodied as intended, the downstream cross-section of the air-conducting bell that marks the end of the receiving compartment provided by the air-conducting bell for the drying of the work piece is greater than the upstream cross-section that marks the beginning of the receiving compartment. This does not preclude the possibility (even though not advisable) of the end of the receiving compartment being followed by a certain narrowing of the air-conducting bell.

In this case, the air-conducting bell is equipped so that at least a part of the drying air flowing through the air-conducting bell flows into the air-conducting bell through at least one first opening that in the optimum case opens out directly into the work piece receiving area inside the air-conducting bell. This at least one first opening constitutes the above-mentioned blower device and is therefore oriented so that it produces a radial air flow. The definitions established above are equally applicable here.

In a preferred embodiment, the at least one first opening is embodied and supplied so that it shapes the radial air flow into an air knife, i.e. an elongated, flat jet, which cuts through the air flow in the air bell, which generally flows in the direction of the air bell's longitudinal axis, and penetrates to the surface of the work piece to be dried.

According to a preferred embodiment, the at least one first opening is embodied in the form of an elongated slot whose longitudinal axis forms a plane with the longitudinal axis of the air-conducting bell or whose longitudinal axis extends in a helix around the longitudinal axis of the air-conducting bell, preferably with a helix angle of greater than 20°, ideally greater than 40°, relative to the respective local circumference line of the air bell.

Preferably, each of these elongated slots extends over a preponderance of the length of the receiving chamber that is available in the air-conducting bell for the work piece to be dried, when the bell is embodied as intended. In general, a slot can be referred to as elongated if the slot length is greater than the slot width by a factor of at least 5. Irrespective of this, a slot as defined by the invention can in any case be referred to as elongated if it has a slot length of preferably >2 cm, or better still >4 cm, with a slot width of <2 mm or better still <1 mm. It is also possible to arrange a plurality of comparatively short elongated slots one after the other along a common line without going beyond the concept of the invention.

For the sake of completeness, it should be noted that the decisive criterion is the effect—groupings of openings that are only separated from one another by slats in such a way that they produce a combined knife-like or bar-like air jet instead of producing purely individual air jets must therefore also be considered equivalent to an elongated slot.

The at least one elongated slot should achieve the fact that when the bell is embodied as intended, thanks to the length of the elongated slot, the radial air flow used according to the invention is available in essentially the entire receiving compartment provided for the work piece to be dried, regardless of whether a shorter work piece protrudes a shorter distance into the receiving chamber of the air-conducting bell or a longer work piece protrudes farther into the receiving chamber of the air-conducting bell. In other words, it is necessary to ensure that each of the work pieces to be dried with the device, when the device is embodied as intended, can be positioned in the work piece receiving compartment of the air-conducting bell without having to take special steps in this connection to make sure that the radial air flow according to the invention sweeps across the work piece with the required intensity.

According to another preferred embodiment, the air-conducting bell guides the cooling air so that after it initially strikes the surface of the work piece to be dried, it swirls there and then flows past the work piece to be cooled, with a movement that is oriented increasingly in the direction along the longitudinal axis of the work piece.

Preferably, the air flow used for the drying is guided in an essentially closed circuit that is composed of at least one pump, preferably embodied in the form of a blower or radial blower, and an air conduit that connects the pressure side and the suction side of the pump with the interposition of a work piece receiving compartment and possibly the air-conducting bell. In this case, the air bell is situated on the inside of the air conduit so that at least part of the air flow used for the drying is guided against the outer circumference surface of the air bell in order to then flow into the air bell via the at least one opening and flow away via the interior of the air bell. This essentially closed circuit preferably features the fact that a large quantity of air circulates in it at a high speed and with a comparatively low overpressure.

In order to improve the drying action, the air flow can be heated, preferably by 5 to 25° C., or better still by 5 to 10° C. This can be achieved by means of an additional heating unit or preferably by using the waste heat of the pump.

According to another preferred exemplary embodiment, the diameter of the air bell, possibly after a section with an essentially constant diameter, increases essentially constantly or in steps toward the outflow side and preferably, but not necessarily, transitions there into another section with an essentially constant diameter. Ideally at its downstream end, the air-conducting bell has an inner diameter that is larger by at least a factor of 1.5, or better still by at least a factor of 1.8, than its inner diameter at the upstream end.

According to another preferred embodiment, the air-conducting bell is supported and driven so that it rotates around its longitudinal axis at least some of the time during the application of the air used for the drying. In this case, it is advantageous if the air-conducting bell rotates at a speed of >50 rpm, or better still at a speed >200 rpm. An air-conducting bell that rotates in this fashion produces a bar-like or air-knife-like air flow that circulates around the work piece to be dried, thus sweeping the work piece surface with a large degree of uniformity. The drive can be provided in the form of an electric motor or can be achieved by exploiting part of the energy of the flow of drying and/or cooling air. The air-conducting bell then has corresponding impeller blades that produce a corresponding drive torque under the influence of the air flowing past.

According to another preferred embodiment, in a region upstream of the work piece receiving area, the air-conducting bell has at least one second opening through which alternatively or in addition to the air flow traveling into the air-conducting bell through the at least one first opening, another air flow travels in, which flows past the surface of the work piece essentially in the longitudinal direction. It is thus possible to produce a relatively intense flow inside the air bell in the longitudinal direction, which inherently has a relatively good drying action and is therefore in a position to effectively convey away the liquid that the radial air flow additionally provided according to the invention has expelled from the problem regions of the work piece.

In this case, the at least one second opening is preferably embodied in the form of a window in the upstream end of the air-conducting bell and in fact, in the best case, is embodied as a window in the circumference surface at the upstream end of the air-conducting bell. Ideally, the at least one second opening can be opened or closed in order to influence or "switch on and off" the air quantity that comes in through it.

Preferably, the air-conducting bell is situated inside the surrounding air conduit in such a way that at least a part of the air flow used for the drying is guided to the outside of the air-conducting bell—and in the preponderance of cases, flows along it for a certain distance—in order to then flow into the air-conducting bell via the at least one opening and then flow out via the interior of the air-conducting bell.

In this case, the air-conducting bell is preferably installed in the air conduit so that the final result is that (essentially) the entire air flow circulating in the device enters the interior of the air-conducting bell at some point and flows through at least a section of the interior of the air bell.

According to another preferred embodiment, the outer circumference of the air-conducting bell communicates with at least two different chambers that are not simultaneously connected—or at least are not connected in a continuously simultaneous manner—to the air flow acting on the air-conducting bell. In this way, it is possible to produce at least one rotating air jet or at least one rotating air knife in the air-conducting bell, even though the air-conducting bell as such is stationary. For this purpose, at least two, but better still at least three first openings are provided in the wall of the air-conducting bell, each of which communicates with a different chamber. As soon as the chambers are alternately connected to the air flow acting on the air-conducting bell and disconnected from it again, rotating air jets or air knives are produced in the chamber.

In order to be able to alternately connect each of the chambers to the air flow and disconnect them again, a rotating control disc is preferably provided, which has at least one window and at least one closed surface segment, which are successively moved into an overlapping position with the at least one opening of the chambers motor, via which opening an air flow travels into the chamber.

Preferably, the inner surface of the air-conducting bell has a spacer attached to it, which ensures that between a work piece inserted into the air-conducting bell and the inner surface of the air-conducting bell a certain minimum space remains free (all over or with locally limited exceptions). This prevents a work piece, which is to be dried, from being inserted into the air-conducting bell in an unfavorable way such that the space between the work piece and the inner surface of the air-conducting bell is so small in some locations that the surface of the work piece at these locations is no longer struck by the flow with sufficient intensity—which in some circumstances results in an insufficient drying. Instead, such a spacer facilitates the insertion of the work piece into the air-conducting bell. The air bell is always lowered onto the work piece until it has reached the end position or it comes into contact with the spacer.

Since the spacers can come into contact with hot regions of the work piece, they are composed of a heat-resistant material, e.g. special plastic types, metal, ceramic, or carbon fiber material.

The spacer is preferably composed of at least one, but preferably several strips extending in the longitudinal direction or along a helix extending along the surface, which strips either do not contact the surface of the air-conducting bell at all or only contact it locally at their anchor points so that in the remaining regions, air can flow essentially unhindered between the strips and the inner surface of the air-conducting bell.

According to another preferred embodiment, during a cooling phase chronologically preceding the drying process, the air-conducting bell can be supplied with a cooling liquid in order to cool the work piece.

Preferably, the air-conducting bell can be acted on with a cooling mist to produce the cooling action, in the best case by means of at least one vaporizer or atomizer that is mounted on or in the region of the upstream end surface of the air-conducting bell and when needed, charges an air flow traveling into the air-conducting bell with finely dispersed cooling liquid.

Having said all of the above, it is now possible to move on to the specific description of exemplary embodiments illustrated by the figures.

Other functions, advantages, and possible embodiments ensue from the following exemplary embodiments described in conjunction with the drawings.

DETAILED DESCRIPTION OF THE PREFERRED EMBODIMENTS

Figure 1:
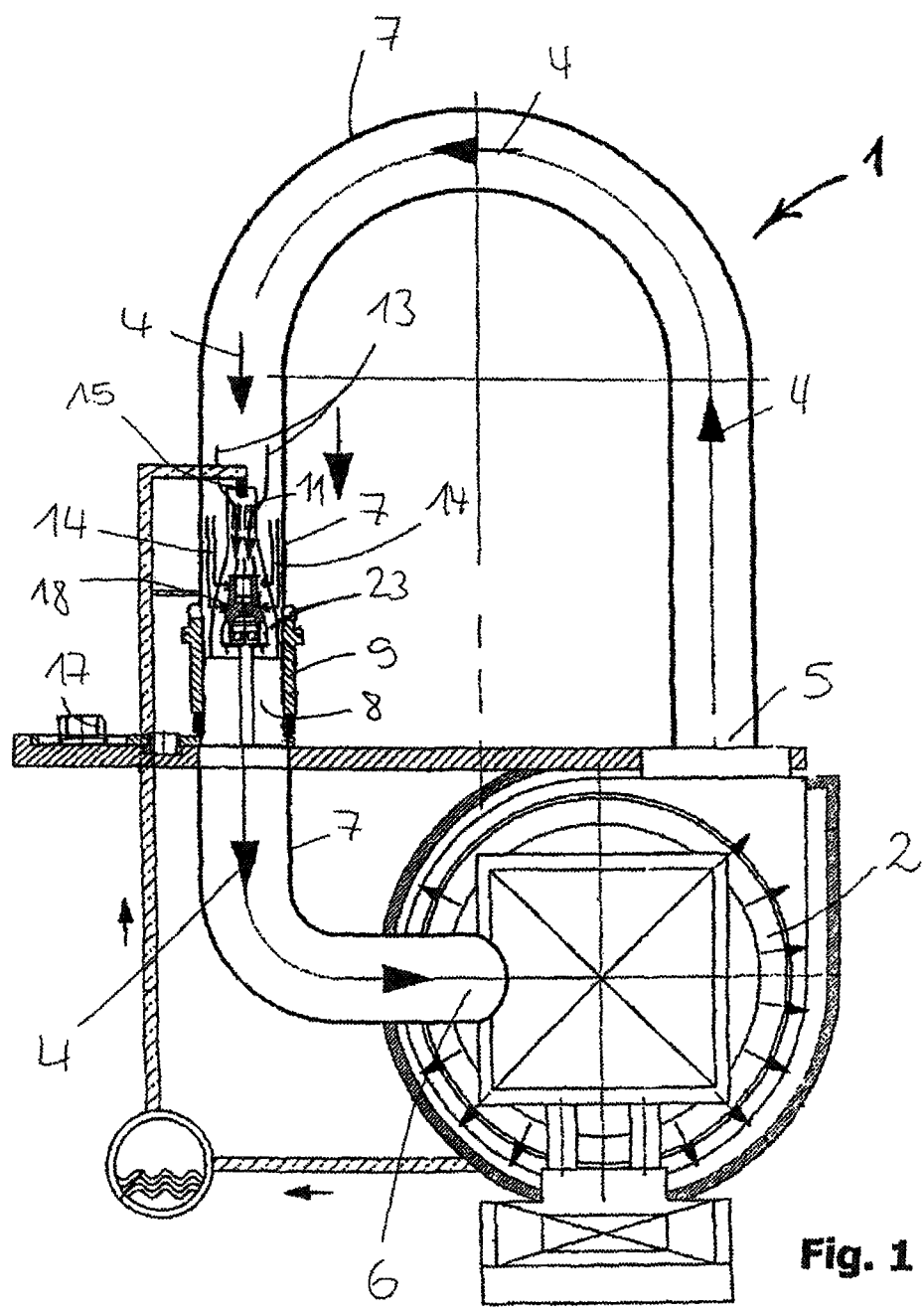
FIG. 1 shows an overview of a device according to the invention during the drying operation.

The devices shown in the exemplary embodiments are without exception embodied as combination devices that can both cool and dry the work piece. Unless otherwise stated, however, the following explanations also apply to devices that are embodied exclusively for drying.

The exemplary embodiments presented in order to explain the invention all function in accordance with the same fundamental principle, which will be explained in greater detail below in conjunction with FIGS. 1 and 2.

A significant portion of the overall device 1 is the pump 2, which is embodied here in the form of a radial blower. The use of a radial blower is particularly advantageous since cooling medium that has precipitated or condensed on the inside of the blower is very easy to remove from a radial blower. In principle, however, it is also conceivable to use a different kind of blower or a pump based on an entirely different principle. The pump can also be composed of a combination of several blowers that can be connected in parallel and/or in series.

The radial blower produces a powerful air flow that in the case of this exemplary embodiment functions as a carrier air flow 3 for the droplets of cooling mist during the cooling phase and as a drying air flow 4 during the drying phase. In the context of the invention, the term "air" is interpreted broadly—it does in fact primarily signify "normal" ambient air because it is the easiest to use and the most readily available, but it can also signify any other gas that is suitable for being blown at the work piece in order to at least dry it.

The pumping capacity of the blower is relatively high, preferably regulatable or controllable, and is preferably greater than 5 m$^3$/minute and better still, greater than 10 m$^3$/minute. The average flow velocity of the air flow used for drying or as a carrier, measured at the work piece, is preferably greater than 0.5 m/s, better still 1.5 m/s, or even 2.5 m/s. The excess pressure inside the closed system in which the air flow circulates is preferably <0.4 bar and better still, <0.15 bar. Preferably, by contrast with what is sometimes proposed in the prior art, the invention is not implemented by using a compressed air jet that is shot at the surface of the work piece to be dried, but rather by using an air quantity that is conveyed at high speed, but low pressure (compared to the pressure at which the compressed air is conveyed, usually between 3 and 10 bar).

The drying air flow 4 and possibly also the carrier air flow 3 is/are guided in an essentially closed circuit; specifically when using air that corresponds to the ambient air, smaller leakage losses can be harmless in specific instances. For this purpose, the pressure side 5 of the blower is connected via a gas conduit 7 to the suction side 6 of the blower; in other words, the gas conduit 7 ensures that the air flow continuously circulates essentially at the speed that is measured in the region close to and downstream of the pump.

The air conduit 7 in the present exemplary embodiment is composed of a round tube that preferably has an inner diameter of >10 cm. The use of a round tube, however, is not absolutely required; it is also theoretically possible to use a flexible hose, a flat conduit, or a conduit with a polygonal cross-section.

The air conduit 7 in the present exemplary embodiment is embodied so that the air flow circulating in it on the pressure side of the pump is first guided in a vertically upward direction and is then deflected by 180° by means of a pipe bend in order to then be guided in a vertically downward direction as a downward flow.

As is clear from FIG. 1, a receiving compartment 8 for the work piece is provided in at least one location in the air conduit. After a sliding sleeve 9 is opened, this receiving compartment can be loaded with the work piece and then closed again in an at least essentially airtight fashion.

Optionally, a supply unit is provided, which in the present case is embodied in the form of a rotating disc 16, which is provided with a plurality of correspondingly embodied work piece sockets 17 into which the work pieces 18 to be cooled can be placed. The rotating disc steers them through the receiving compartment 8 one after another in step-by-step fashion in that it rotates further by the corresponding angle with each change.

The inside of the air conduit 7 accommodates the air-conducting device 10, which in this case is embodied in the form of an air-conducting bell and has likewise been labeled with the reference numeral 10.

For this reason, the text below uniformly speaks only of an air-conducting bell; but the term can also generally be read—providing that the context does not indicate anything to the contrary—to mean an air-conducting device, although the term air-conducting device generally has a meaning that can be interpreted more broadly than the term air-conducting bell.

The air-conducting bell is accommodated entirely inside the air conduit 7, i.e. the air conduit 7 completely encloses the air-conducting bell. In this case, the air-conducting bell 10 is accommodated in the air conduit 7 so that its outside can be struck by the flow of the air circulating in the air conduit. The air-conducting bell delimits the receiving compartment 8 from the air conduit 7.

Below the air-conducting bell, a device for lifting the work piece is provided, embodied here in the form of a small lifting table 19, which optionally cooperates with the rotating disc 16 so that it can lift its respective work piece socket 17 together with the work piece 18 placed therein. By means of this or by means of other positioning means, the work piece is lifted into the work piece receiving compartment 23 of the air-conducting bell until it has reached its correct position.

Alternatively (and definitely preferably), it is also possible to embody the air-conducting bell so that it can be raised for the reloading of the receiving compartment and then lowered again over the work piece that has been inserted into the receiving compartment 8 in the meantime.

As is at least approximately clear from FIG. 1, the air-conducting bell has openings 11, 12, via which the air flow circulating in the air conduit 7 travels into the interior of the air-conducting bell.

At its upstream end, the air-conducting bell—in the upper third, preferably above the boundary of the region of the receiving region provided, when embodied as intended, for receiving the work pieces to be dried—has at least one second air inlet opening 11 via which a not insignificant portion of the total available air flow travels into the air-conducting bell as a so-called second partial air flow 13. This partial air flow 13 reaches the work piece contained in the air-conducting bell as an air flow that sweeps across the work piece essentially in the direction along its longitudinal axis. Preferably, the circumference of the air-conducting bell, instead of being provided with only one air inlet opening, is provided with a plurality of (mostly uniformly) distributed air inlet openings, ideally three or even at least four.

Another not insignificant portion of the total available air flow passes the air-conducting bell on its outside until this so-called first partial air flow 14 reaches the boundary—or a place downstream of this boundary—of the region provided, when embodied as intended, inside the air-conducting bell for accommodating the work pieces to be dried. In this case, at least one blower embodied in the form of a first air inlet opening 12, which shapes this first partial air flow 14 into at least one radial air flow in the above-described way and allows it to travel into the inside of the air-conducting bell. The partial air flow 14 temporarily embodied in the form of a radial air flow, when it first strikes the surface of the work piece, also sweeps in an intensive fashion across the problem zones of the work piece (grooves, recesses, counterbores, and locations with abrupt changes in diameter) and entrains the cooling liquid droplets that are still sticking there. After its first impact with the surface of the work piece, the partial air flow 14 changes its direction and, carrying along with it the droplets of cooling fluid that it has entrained, joins with the partial air flow 13 already flowing in the longitudinal direction of the work piece in order to then flow out along with this other partial air flow.

Preferably, the above-mentioned blower device is composed of at least one, but preferably at least three or better still, six to ten first openings 12 in the wall of the air-conducting bell. This at least one first opening is dimensioned and embodied so that it produces a radial air flow according to the above-described definition.

In connection with all of the above, it should be noted that it is advantageous, but not absolutely required, for the partial air flow 13 and the partial air flow 14 to flow at the same time.

In lieu of this, the device can also be operated according to the invention so that (at least in the drying phase), the entire available air flow is conveyed along the path that has been described above for the first partial air flow 14. Alternatively, the device can also be operated so that during a certain time interval, only the first partial air flow 14 flows and during another time interval, only the second partial air flow 13 flows.

Despite the only schematic depiction, FIG. 1 clearly shows that the air-conducting device 10 embodied here in the form of an air-conducting bell guides the air flow that flows along the work piece essentially in the longitudinal direction of the air-conducting bell (i.e. from top to bottom in this case) so that it is forced to travel along the surface and close to the surface, preferably within a predetermined maximum distance from it.

As mentioned above, the exemplary embodiments on the basis of which the invention is explained are simultaneously also used to cool the work piece. A spray device 15 is provided for this purpose. In the simplest case, this functions as shower of liquid. Preferably, however, it is embodied in the form of an atomizer and then functions as described in the application DE 10 2009 034 730 (this application also refers to the atomizer as an injector). The introduction of a cooling liquid vapor into the carrier air stream produces an air/cooling liquid dispersion that is preferably mainly composed of air in terms of its volume.

Ideally (although not absolutely necessarily), such an atomizer is accommodated in the vicinity of the upstream end of the air-conducting bell, preferably inside the latter.

Figure 2:
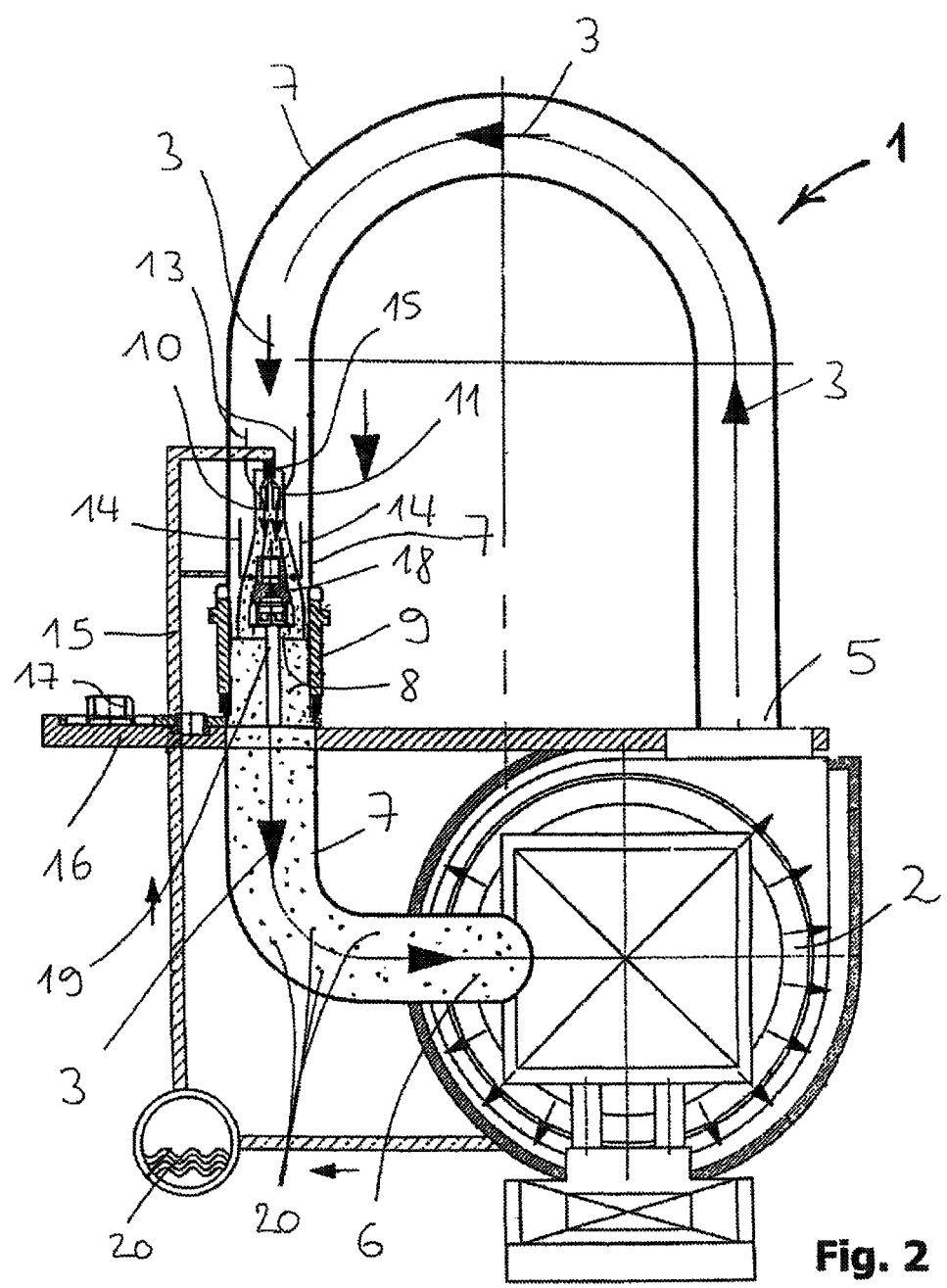
FIG. 2 shows an overview of the device according to the invention during the cooling operation.

During the cooling cycle, the device then functions as shown in FIG. 2.

The atomizer is mounted so that the droplets produced by it are entrained by the air flow traveling turbulently through the at least one second air inlet opening 11 into the air-conducting bell and in finally dispersed form, is transported past the work piece, preferably without precipitating out from the carrier air to a significant degree.

In this way, the work piece is gently but uniformly and nevertheless quickly cooled—without the work piece being excessive wetted with liquid.

Further details of the optional possibility of embodying the device according to the invention in the form of a combination device with which the cooling cycle and the drying cycle can be implemented within a single device (preferably without having to handle the work piece in between) will be described further below.

Figure 3:
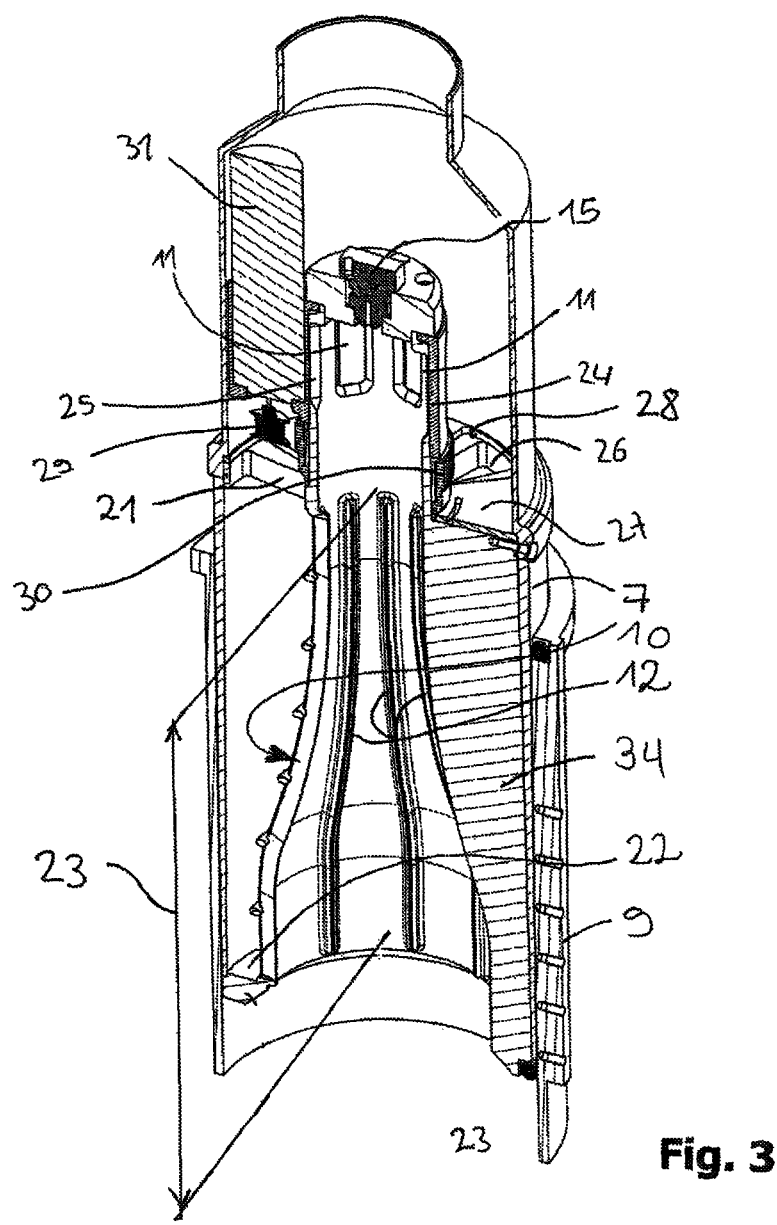
FIG. 3 shows longitudinal section through a detail of a device embodied according to FIGS. 1 and 2, in the vicinity of the receiving compartment for the insertion and holding of the work piece to be dried.

FIG. 3 shows the details of the air-conducting bell 10 according to the invention. As is clear here once again, the air-conducting bell is inserted into the interior of the air conduit 7. At its upstream end, it is mounted to the inside of the air conduit 7 by means of a first collar 21 and at its downstream end, it is mounted to the inside of the air conduit 7 by means of a second collar 22. The second collar is preferably embodied so that it prevents part of the air flow in the "bypass" from flowing past the air-conducting bell. The air-conducting bell is preferably composed of plastic.

The drawing clearly shows the region 23 of the air-conducting bell provided for accommodating the work piece. In this case, it is provided with a total of six first air inlet openings 12 that are distributed uniformly along the circumference of the air-conducting bell and in this case, form a so-called blower device.

These first air inlet openings 12 each extend essentially in the direction of the longitudinal axis of the air-conducting bell 10. They are each embodied in the form of a respective elongated slot in the wall of the air-conducting bell, extending essentially along the entire receiving compartment 8 for the work piece to be dried.

Above the region provided for regularly accommodating work pieces to be dried, the air-conducting bell is provided with second air inlet openings 11 that in this case constitute a plurality of windows spaced apart from one another, through which at least a second portion of the air flow can travel into the air-conducting bell. These air inlet openings 11 can be opened and closed with the aid of a control disc 24. The control disc 24 is embodied in the form of a cylindrical sleeve that is fastened in rotating fashion to the air-conducting bell and overlaps the latter's section that is provided with the second air inlet openings 11. The control disc 24 is provided with openings 25 that at least essentially correspond to the second air inlet openings 11. Depending on the rotation position of the control disc 24, the openings 11 and 25 fully or partially coincide with one another or do not coincide with one another at all ("completely closed"). It is thus possible to "switch on and off" and optionally even control the air flow traveling into the air-conducting bell via the at least one second opening. The slider 24 is preferably moved by means of an electric motor.

The first collar 21 of the air-conducting bell situated at the upstream end has third openings 26. Resting against the collar is a rotatable control disc 27, which in turn has fourth openings 28 that essentially correspond to the third openings 26. Depending on the rotation position of the control disc, these openings fully or partially coincide with one another or do not coincide with one another at all. It is thus possible to regulate and even control the air flow traveling into the air-conducting bell via the at least one first air inlet opening 12.

Preferably, the control disc 27 is used to supply a plurality of air inlet openings 12 one after another with air so that a rotating movement is produced—preferably in the form of one or more air knives rotating inside the air-conducting bell.

For this purpose, at least two or better still, at least three partition walls or ribs 34 extending in the longitudinal direction of the air-conducting bell are provided, which, together with the air conduit 7 (or another wall), form a plurality of chambers that surround the air-conducting bell 10. Each of the chambers can be supplied with an air flow via at least one third opening 26 of the control disc 27 and can be separated from the air supply with the aid of a windowless section of the control disc 27. Through rotation of the control disc, the plurality of first air inlet openings 12 can be successively supplied with air, individually or in groups, so that in the air-conducting bell, a rotating radial airflow forms, which is particularly effective because each part of the surface of the work piece to be dried is swept by the radial airflow along an extremely short path at a particular time.

Preferably, the control disc 27 and the control disc 24 are actuated by a shared electric motor 31. For this purpose, the electric motor is mounted to the control disc 24 and "travels" along with it. On the other hand, the electric motor drives the second pulley 30 provided on the control slider 24, preferably by means of a gear or, with the aid of a first belt pulley 29, by means of a belt that is not shown here. The control slider 24 is driven by using the reaction torque on the motor housing that is produced when the motor exerts a torque on the control disc 27—if the motor is driven counterclockwise, then its reaction torque rotates the control slider 24 until it comes to a stop in the "open" or "closed" position; if the motor is driven clockwise, then its reaction torque rotates the control slider 24 until it comes to a stop in the "closed" or "open" position.

The electric motor 31 can be accommodated inside the air conduit 7.

For the sake of completeness it should also be noted that FIG. 3 also offers a detailed view of how the spray device 15 is attached to the air-conducting bell—with the aid of a cap that closes the upstream end surface of the air-conducting bell.

FIG. 3 also shows the sliding sleeve 9.

Figure 4:
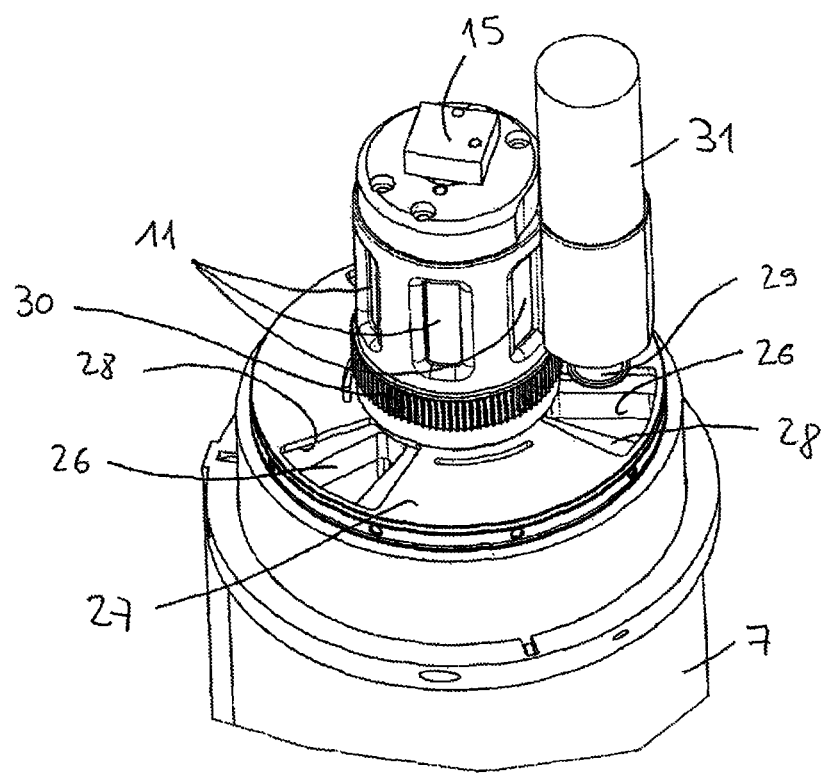
FIG. 4 is a partial view of FIG. 3, in a non-sectional view from diagonally above.

FIG. 4 shows a depiction of the first exemplary embodiment corresponding to FIG. 3, but in a non-sectional view.

Figure 5:
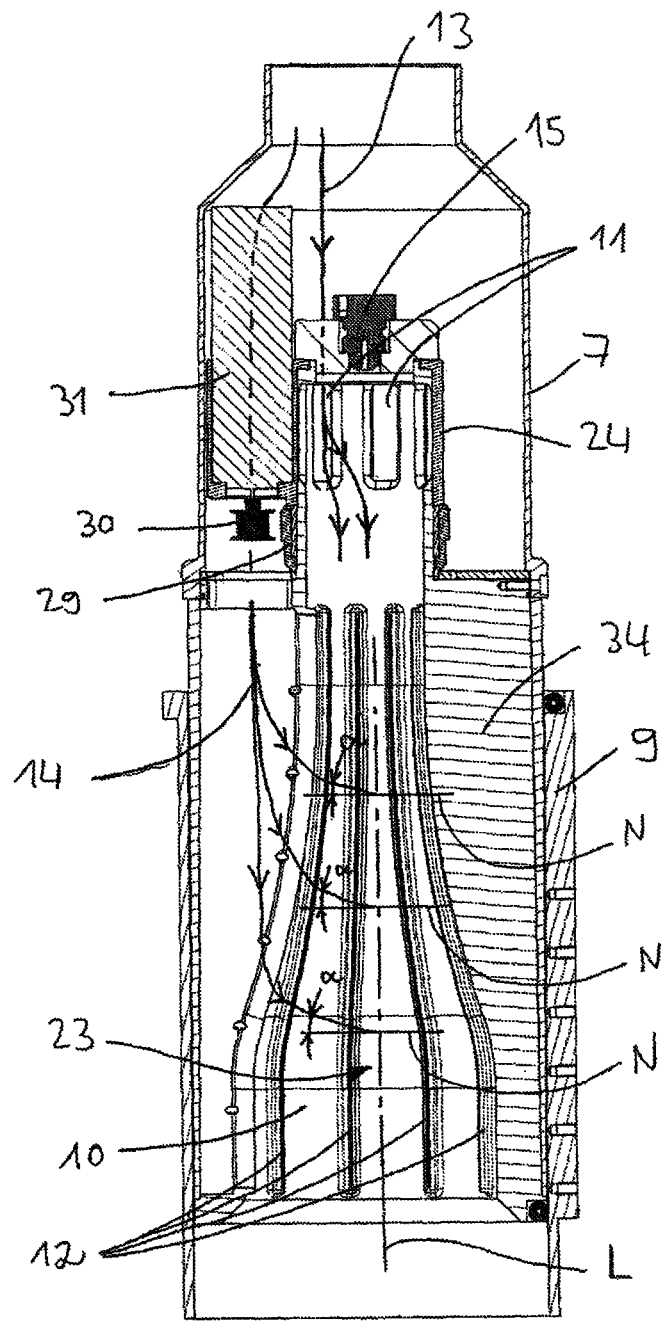
FIG. 5 shows a planar section through the device shown in FIGS. 3 and 4.

FIG. 5 also shows a depiction of the first exemplary embodiment corresponding to FIG. 3, but in a perspective viewed perpendicularly from the side. Here once again, the drawing shows the essentially expected main directions of the turbulent partial air flows to be expected.

It is clear here how the first partial air flow 14 produced by the blower devices and the first air inlet openings 12 that constitute them travels into the air-conducting bell 10 and in it, strikes the longitudinal axis L—which is only suggested here—of the work piece and the air-conducting bell at an angle α to the normal.

Figure 6:
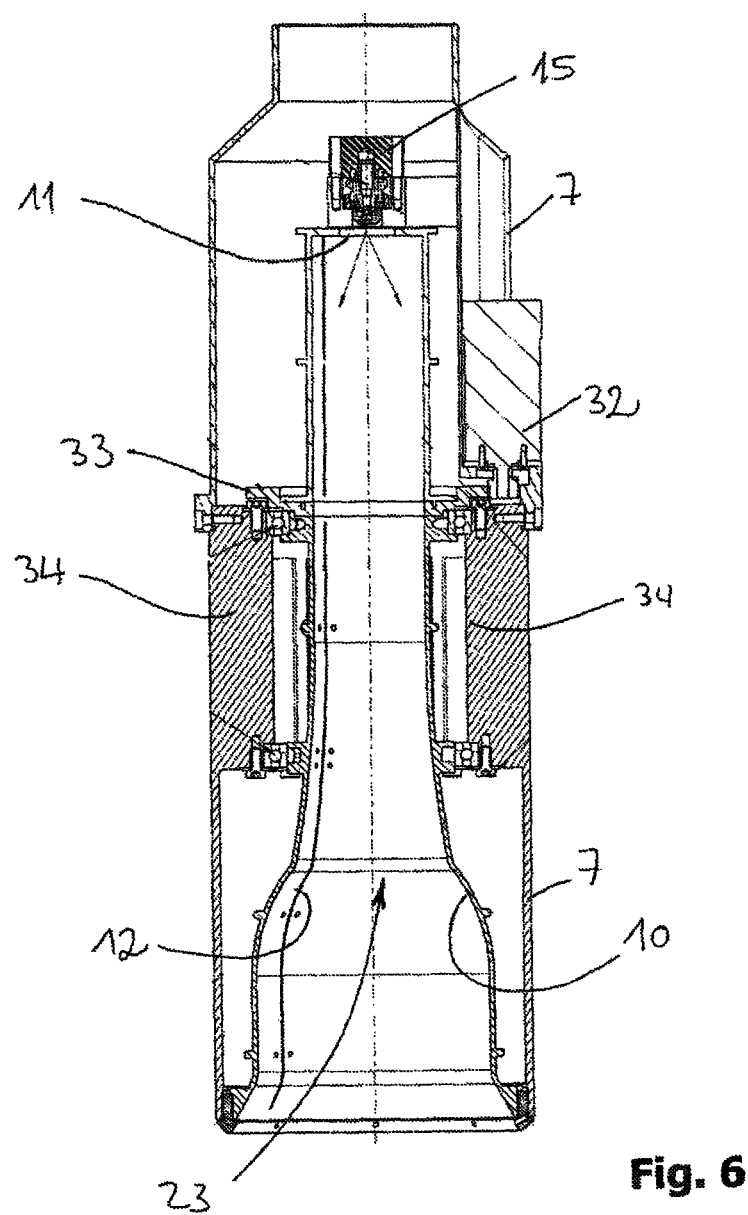
FIG. 6 shows a detail of a second piece of equipment according to the invention, which is essentially embodied the same as the one shown in FIGS. 1 and 2, but which differs from the first exemplary embodiment in the details that are shown in FIG. 6.

FIG. 6 shows a second exemplary embodiment of the invention. In this exemplary embodiment, the air-conducting bell 10—by contrast with the prior embodiment—is not mounted in stationary fashion in the air conduit 7, but rather is supported in the latter in rotating fashion, preferably with the aid of a plurality of ribs 34 protruding into the interior of the air conduit 7, which form corresponding bearing rings or bearing seats and preferably hold roller bearings. Between these ribs, spaces are provided so that at least part of the air flow available for the drying can flow past the ribs and can only travel into the interior of the air-conducting bell downstream of them.

During the drying cycle, the air-conducting bell is driven in rotating fashion at least some of the time. Before the rotating motion starts, the air-conducting bell is raised slightly in order to avoid any frictional contact with the work piece. The rotary drive is provided by an electric motor 32 and a gear 33 mounted on the air-conducting bell on which this electric motor acts. The gear protrudes outward from the air conduit 7 and is driven by the motor, which is situated outside the air-conducting conduit. Alternatively, it is possible to accommodate the motor inside the air-conducting conduit.

Due to the fact that the air-conducting bell rotates at least some of the time during the drying cycle, it may possibly be sufficient to equip the air-conducting bell with only a single blower device, which is embodied here in the form of a single first air inlet opening 12 in the wall of the air-conducting bell 10. Even with a rotatable air-conducting bell, however, it can also be advantageous in specific cases to equip it with a plurality of first air inlet openings 12 distributed around its circumference.

The spray device here is once again labeled with the reference numeral 15 and in this case is mounted in stationary fashion in the air conduit 7, outside the air-conducting bell, in the vicinity of its upstream end. The spray device 15 sprays or atomizes the cooling liquid into the inside of the air-conducting bell via at least one second opening 11 preferably provided in the end surface of the air-conducting bell.

Figure 7:
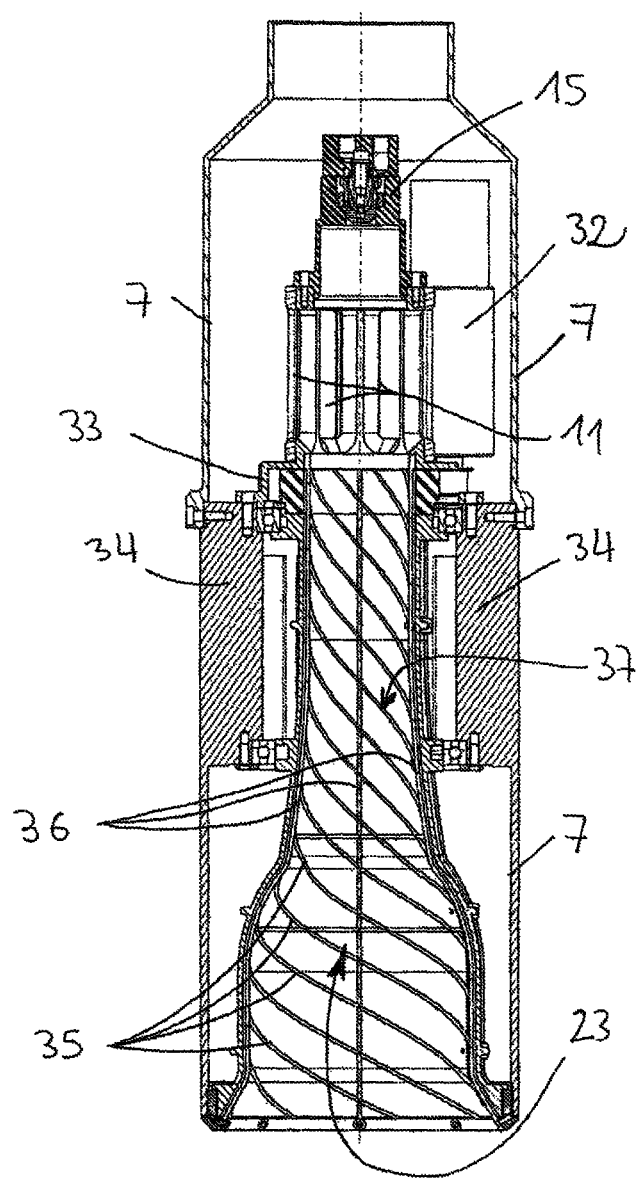
FIG. 7 shows a third exemplary embodiment, which serves to illustrate the possible appearance of a spacer, which can be used in all of the exemplary embodiments according to the invention.

FIG. 7 shows an exemplary embodiment of the spacer according to the invention that can be used in all of the exemplary embodiments described here.

In this case, the spacer is embodied in the form of a kind of "cage" 37 whose outer contour essentially corresponds to the contour of the inner surface of the air-conducting bell, but with a smaller diameter. The cage is composed of longitudinal strips 36 and in the present case, strips that are arranged along a helix and function as spacers 35. This cage is inserted into the air-conducting bell and attached to it so that (apart from possible attachment points) at least the spacer or spacers 35 is/are situated spaced apart from the inner surface of the air-conducting bell. When embodied as intended, the "mesh width" or "grid spacing" of the cage is smaller than the smallest work piece to be inserted into the air-conducting bell so that the cage also reliably holds this smallest work piece spaced apart from the inner surface of the air-conducting bell.

Last but not least, as explained above, additional details regarding the optional possibility of simultaneously also implementing a cooling of the work piece with the device will now be discussed.

With regard to the cooling, the invention is not based on the concept of using the liquid coolant in a largely undiluted fashion, as is the case in immersion cooling or flush cooling, but rather is based on the concept of dispersing it into comparatively fine droplets, i.e. to dilute it so to speak, and then transporting these droplets by means of the air flow that is available anyway, using it as a carrier air flow for this purpose. This offers the possibility of guiding the coolant droplets at an elevated velocity past the item to be cooled—so that a rapid, but not too intense, cooling occurs, which is also extremely uniform. In this case, the transport by means of the carrier gas (which ideally circulates in a closed loop) has the advantage of permitting the use of preferably much finer droplets than in the known spraying or atomizing, which—provided that a dispersion into individual droplets actually occurs—depends on a comparatively large droplet size since only in this way can the individual droplets be accelerated powerfully enough to make it all the way to the item to be cooled.

In this case, it is generally true that the finely dispersed liquid coolant is what absorbs most of the thermal energy to be dissipated.

An advantage of the cooling according to the invention is the fact that the droplets can be selected so that even if the droplets spontaneously vaporize upon striking the surface of the item to be cooled, this does not result in uneven cooling—by contrast with an immersion cooling or flush cooling in which the vaporizing coolant produces more or less large local vapor bubbles that temporarily hinder the transmission of heat and therefore create the danger of irregularities. In addition, vapor produced with the method according to the invention is immediately entrained by the carrier gas flow, conveyed away, cooled down again, and re-condensed. The latter is also important when using water with corrosion inhibitors because the latter produce vapors that are hazardous to health.

Ideally, the vaporization or atomization of the coolant is so fine that its droplets are not only transported into the cooling chamber by the carrier gas flow, but are essentially also transported back out of it again. In this way, the item to be cooled is not excessively wetted, but instead continuously comes into contact with new, fresh droplets. The droplets are at least predominantly so fine that their movement is not significantly influenced by the force of gravity or by the forces that the surface of the item to be cooled exerts on them, but instead is determined largely by the forces that the carrier gas flow exerts on them.

This makes it possible to influence the intensity of the cooling in a particularly favorable way by temporarily varying the speed of the carrier gas flow and/or the quantity of the liquid coolant introduced into the carrier gas flow.

At the same time, the fact that the coolant flow travels at an increased speed and in terms of volume, is predominantly composed of the carrier gas and not of the liquid coolant, makes it possible to shape the coolant flow without exerting a particular amount of effort, for example focusing it on the item to be cooled and/or imparting a swirling motion to it.

A general, commonly applicable measure for the size of the coolant droplets can only be specified with difficulty since its ideal size depends significantly on the individual circumstances.

As a general rule of thumb, it can be stated that in most cases, the coolant droplets should have a diameter that is at least smaller than 1 mm or significantly better still, is at least predominantly smaller than 0.5 mm. In the ideal case, the coolant droplets are at least predominantly smaller than 0.1 mm or are so finely vaporized that they combine with the carrier gas to form a true mist. Preferably, the coolant droplets are already given the above-mentioned diameters in the course of their initial vaporization or atomization. In principle, however, it is sufficient if coolant droplets that have the above-mentioned diameters are only produced in the course of the additional swirling, but essentially before striking the item to be cooled.

Water is used as the coolant in the present case because water is inexpensive, easy to obtain, and inherently speaking, is physiologically harmless. Naturally, corrosion inhibitors or other additives can be added to the water such as those that influence the wetting of the item to be cooled or influence the droplet formation. This naturally also applies to the use of liquid coolants other than water.

Preferably, the cooling device has a cooler downstream of the item to be cooled. This cooler does not just reduce the temperature of the coolant flow, thereby ensuring a more efficient cooling the next time the coolant circulates. In addition, the cooler also generally contributes to separating the coolant, in particular the water used for this purpose, from the carrier gas flow again. In this way, a relatively "dry" carrier gas flow is always available on the pressure side of the blower. This opens up the possibility of adding a specific, metered quantity of coolant to the carrier gas flow again each time it circulates through the loop, thus specifically influencing the cooling process.

Instead of or in addition to a cooler, a mechanical droplet separator can also be used, e.g. in the form of a centrifugal separator or in the form of a multi-stage deflecting device that deflects the air flow so that the droplets are separated from the air flow. If need be, it is also possible to use a radial blower that simultaneously functions as a droplet separator due to the centrifugal forces that it exerts on the air. The liquid coolant, which has been separated out by the centrifugal force that the impeller of the radial blower exerts on the carrier gas flow, can then be captured very simply with the aid of an appropriately embodied casing of the radial blower and then withdrawn by means of a pump.

This also prevents the device from emitting any appreciable amount of moisture. This moisture could condense in the vicinity of the device and contaminate the workplace.

For the sake of orderliness, it should be noted quite generally that the invention is directed not exclusively, but preferably at a device for drying tool chucks or even (more specialized) shrink fit chucks so that wherever the term "work piece" has been used up to this point, the term "tool chuck" or "shrink fit chuck" can also be alternatively used when addressing only a more limited application range of the invention.

Regardless of the restricting features of the proposed main claim, protection is also claimed for a device for drying a work piece, preferably in the form of a shrink fit chuck, that has previously been subjected to an application of a liquid and is essentially rotationally symmetrical around a longitudinal axis of the work piece, characterized in that the device has at least one hood or bell 10 that encompasses the work piece, whose circumference wall encompassing the work piece is provided with at least one slot through which a radial air flow travels into the hood or bell and ideally first strikes the surface of the work piece in a direction that is (essentially, i.e. ±10 degrees) parallel to this normal or first strikes the surface of the work piece obliquely in the manner defined above.

The above-mentioned hood is a component that is similar to the above-described air-conducting bell, but can also be embodied, for example, in the form of a cylindrical "pot" that has an essentially constant diameter and is open at only one end surface or both of them.

For sake of good order it is notified that the expressions "air-conducting bell" and "air bell" have the same meaning.

The invention claimed is:

1. A device for drying a work piece in the form of a shrink fit chuck, wherein the work piece has previously been subjected to an application of a liquid and is essentially rotationally symmetrical around a longitudinal axis of the work piece, the device comprising:
   at least one air-conducting, device in the form of an air-conducting bell that encompasses the work piece at least during a drying cycle in order to convey an air flow in the direction along the longitudinal axis of the work piece, wherein a diameter of an interior formed by the air-conducting bell is not constant, with a diameter of the air bell after a section with an essentially constant diameter increasing toward an outflow side and transitioning into another section there with an essentially constant diameter, and at least part of the drying air flowing through the air-conducting bell enters the air-conducting bell through at least one first opening, which is oriented so that a part of the air flow traveling through it into the air-conducting bell strikes the surface of the work piece to be dried in the form of a radial air flow, and wherein the air bell is situated on an inside of an air conduit so that at least part of the air flow used for the drying is guided against an outside of the air bell in order to then flow into the air bell via the at least one first opening and flow away via the interior of the air bell; and
   the device has at least one blower device that directs the radial air flow at the work piece.

2. The device as recited in claim 1, wherein the air-conducting device encompassing the work piece is embodied so that it conveys the air flow along a region close to a surface of the work piece.

3. The device as recited in claim 1, wherein the diameter of a receiving compartment formed by the interior of the air-conducting bell increases constantly toward an outlet end.

4. The device as recited in claim 1, wherein the at least one opening is embodied and supplied so that the air flow traveling, through it into the air bell forms an air knife that penetrates the air flow occurring in the air bell and traveling essentially in the longitudinal direction along the surface of the work piece to be dried and strikes the surface to be dried in the form of a radial air flow.

5. The device as recited in claim 1, wherein the at least one opening is embodied in the form of an elongated slot whose longitudinal axis forms a plane with the longitudinal axis of the air bell or whose longitudinal axis extends in a helix around the longitudinal axis of the air-conducting bell with a helix angle of >40 degrees relative to a respectively local circumference line of the air bell.

6. The device as recited in claim 1, wherein the air-conducting bell guides cooling air so that after the cooling air initially strikes the surface of the work piece to be dried, the cooling air flows away past the work piece to be cooled, essentially in the direction along the longitudinal axis of the work piece.

7. The device as recited in claim 1, wherein the air flow used for the drying is guided in an essentially closed circuit that comprises at least one pump embodied in the form of a blower or radial blower, and the air conduit, which connects a pressure side and a suction side of the pump with the interposition of a work piece receiving compartment.

8. The device as recited in claim 7, wherein in a region upstream of the work piece receiving area, the air bell has at least one second opening through which alternatively or in addition to the air flow traveling into the air-conducting bell through the at least one first opening, another air flow travels in, which flows past the surface of the work piece essentially in the longitudinal direction.

9. The device as recited in claim 7, wherein in order to improve the drying action, the air flow can be heated by 5 to 10° C., and the heating is produced by an additional heating unit and/or using at least part of the waste heat of the pump.

10. The device as recited in claim 1, wherein the air bell is supported and driven so that the air bell rotates around its longitudinal axis at least some of the time during the application of air used for drying.

11. The device as recited in claim 1, wherein the air-conducting bell has a plurality of first openings provided at various locations of its circumference, which can be activated or deactivated separately from one another by using a control disc to control the air flow from outside of the air-conducting bell, thus permitting or preventing an air flow from traveling through them into an inside of the air-conducting bell, and the first openings are activated or deactivated in such a way as to result in a circular motion.

12. The device as recited in claim 1, wherein an outer circumference of the air-conducting bell communicates with different chambers that are not simultaneously connected to the air flow acting on the air-conducting bell or at least are not connected to this air flow in a continuously simultaneous manner.

13. The device as recited in claim 1, wherein during a cooling phase chronologically preceding the drying process, the air-conducting bell can be acted on with a cooling liquid in order to cool the work piece.

14. A device for drying, a work piece in the form of a shrink fit chuck, wherein the work piece has previously been subjected to an application of a liquid and is essentially rotationally symmetrical around a longitudinal axis of the work piece, the device comprising:
at least one air-conducting device in the form of an air-conducting bell that encompasses the work piece at least during a drying cycle in order to convey an air flow in the direction along the longitudinal axis of the work piece, wherein a diameter of an interior formed by the air-conducting bell is not constant, and at least part of the drying air flowing through the air-conducting bell enters the air-conducting bell through at least one first opening, which is oriented so that a part of the air flow traveling through it into the air-conducting bell strikes the surface of the work piece to be dried in the form of a radial air flow, and wherein the air bell is situated on an inside of an air conduit so that at least part of the air flow used for the drying is guided against an outside of the air bell in order to then flow into the air bell via the at least one first opening and flow away via the interior of the air bell, and wherein a spacer is attached to an inner surface of the air-conducting bell, ensuring that between a work piece inserted into the air-conducting bell and the inner surface of the air-conducting bell, a certain minimum space remains free; and the spacer includes a plurality of strips extending in the longitudinal direction or along a helix extending along the surface; and
the device has at least one blower device that directs the radial air flow at the work piece.

15. A device for drying a work piece in the form of a shrink fit chuck, wherein the work piece has previously been subjected to an application of a liquid and is essentially rotationally symmetrical around a longitudinal axis of the work piece, the device comprising:
at least one air-conducting device in the form of an air-conducting bell that encompasses the work piece at least during a drying cycle in order to convey an air flow in the direction along the longitudinal axis of the work piece, wherein a diameter of an interior formed by the air-conducting bell is not constant, and at least part of the drying air flowing through the air-conducting bell enters the air-conducting bell through at least one first opening, which is oriented so that a part of the air flow traveling through it into the air-conducting bell strikes the surface of the work piece to be dried in the form of a radial air flow, and wherein the air bell is situated on an inside of an air conduit so that at least part of the air flow used for the drying is guided against an outside of the air bell in order to then flow into the air bell via the at least one first opening and flow away via the interior of the air bell, and wherein the air-conducting bell can be acted on with an air/liquid dispersion with at least one vaporizer or atomizer that is mounted on or a region of an upstream end surface of the air-conducting bell and when needed, charges an air flow traveling into the air-conducting bell with finely dispersed cooling liquid; and
the device has at least one blower device that directs the radial air flow at the work piece.

* * * * *